Aug. 25, 1964    R. C. STRAUSS    3,145,814
VEHICLE CONTROLS
Original Filed Jan. 7, 1952    2 Sheets-Sheet 2
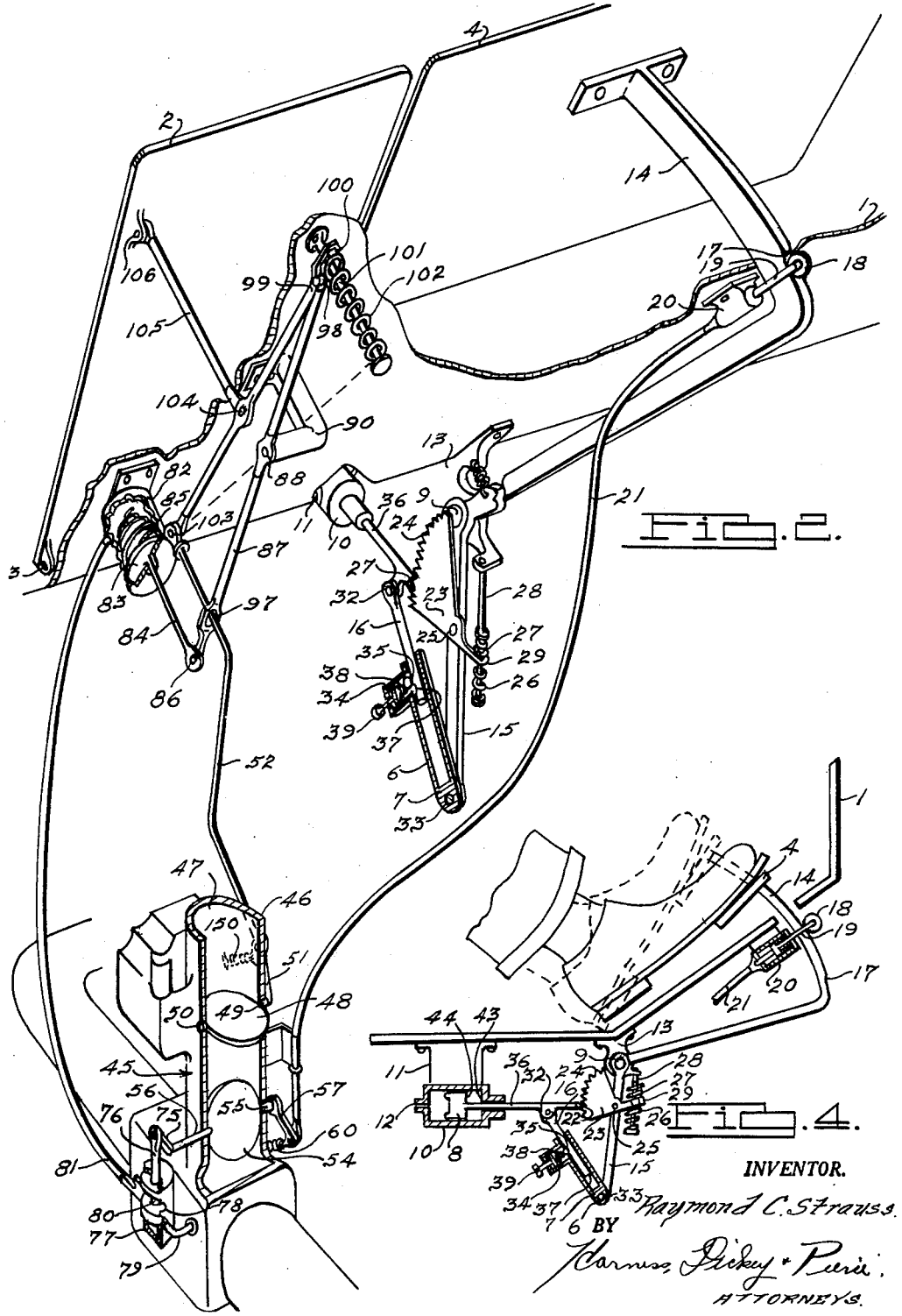
INVENTOR.
Raymond C. Strauss
BY
Harness, Dickey & Pierce
ATTORNEYS.

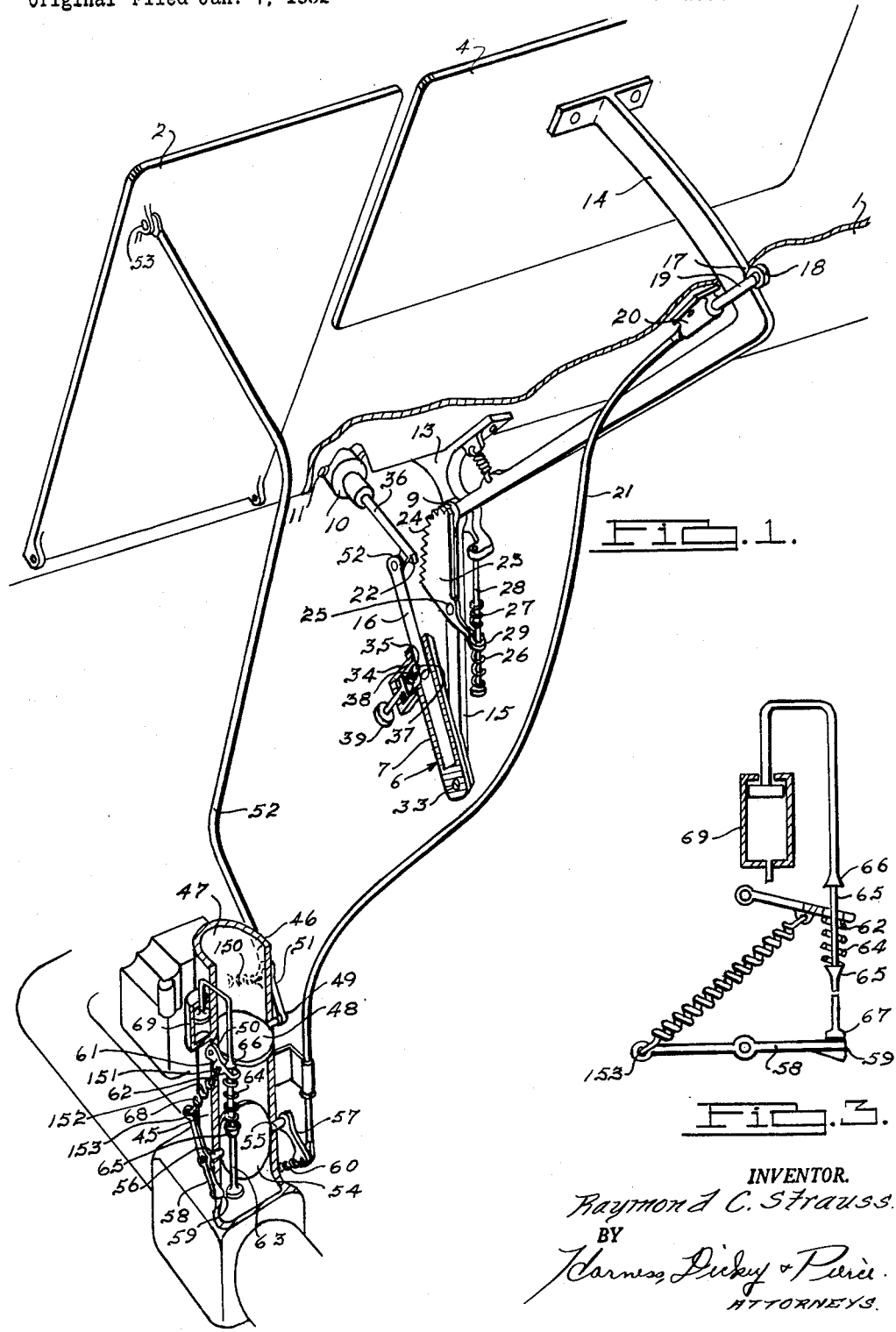

United States Patent Office 3,145,814
Patented Aug. 25, 1964

3,145,814
VEHICLE CONTROLS
Raymond C. Strauss, 933 S. Forest, Ann Arbor, Mich.
Continuation of application Ser. No. 265,323, Jan. 7,
1952. This application May 6, 1957, Ser. No. 657,433
15 Claims. (Cl. 192—3)

The present invention relates to improvements in motor vehicle controls and particularly relates to improvements over the types of such controls disclosed and claimed in the copending applications of Raymond C. Strauss, which are now Patents 2,642,166 and 2,912,081, and this application is, in particular, a continuation of my copending case Serial No. 265,323 (now abandoned) which in turn was a continuation-in-part of my copending application (now abandoned), Serial No. 639,245, filed January 5, 1946, entitled "Vehicle Motor Control."

One of the primary objects of the present invention is to provide improvements in controls of the type mentioned whereby the action of the accelerator and brake are coordinated so that it is possible to apply the brake with the left foot in complete safety and comfort, advantages especially desirable in automobiles employing automatic transmissions.

A further object of the invention is to provide a coordinated accelerator and brake system so that when either the left or right foot is used for braking, any action of the accelerator will be rendered ineffective on the carburetor, thus eliminating the danger of feeding gas when the brake is applied.

A further object of the invention is to provide a brake pedal upon substantially the same level as the accelerator, in which the stroke of the brake is reduced in length over that of the conventional brake stroke, so that it is comfortable for the driver to rest his left foot upon the brake pedal at all times and to apply the brake with a foot motion approximating the motion required to actuate the accelerator.

A further object of the invention is to provide a brake which uses a greater proportion of the brake stroke for setting the brakes and a lesser proportion for contacting the brake shoes than heretofore, thereby locating the brake pedal in an effective stopping location more rapidly, for greater safety of control and permitting the use of a brake with a shorter total stroke.

A further object of the invention is to provide alternate means for rendering ineffective accelerator action under braking conditions, thereby providing a means of control for the various types of carburetors now in commercial use, some of them being provided with easily overruled, externally projecting, supplementary control arms, and others being provided with internally located supplementary control means which cannot be overruled in a simple manner.

Other objects will become apparent from the following specification, the drawings relating thereto and from the claims hereafter set forth.

In the drawings, in which like numerals are used to designate like parts in the several views throughout, FIGURE 1 is a perspective view of the coordinated accelerator and brake, the control means thereof, and their relationship to each other, illustrating one embodiment of the present invention;

FIG. 2 is a perspective view of the coordinated system, illustrating a modified embodiment of the present invention for controlling the accelerator, the brake pedal being shown in a released position, and the braking mechanism along with the master cylinder being shown for purpose of illustration in an initial partially actuated position;

FIG. 3 is an enlarged view of the carburetor accelerator pump and overruling control shown in FIG. 1; and FIG. 4 is a side elevational view of a portion of the structure of FIG. 1, but showing the brake pedal and braking mechanism in a fully actuated position.

Referring to the drawings and referring particularly to FIGS. 1, 2, 3, and 4 thereof, one embodiment of the present invention is illustrated. In FIG. 1, a portion of the engine compartment is more or less diagrammatically illustrated looking up toward the floorboard of the driver's compartment. The usual inclined floorboard 1 is shown having an accelerator treadle 2 pivotally mounted to the floorboard by a pivot 3 located along the lower edge of the treadle 2. The pedal or treadle 2 may be held in its normal idling position by means of a spring disposed between the underside of the treadle 2 and the floorboard, in the usual way. The pedal 2 is conveniently located for the right foot of the operator, or driver.

A brake pedal 4, at approximately the same level as accelerator treadle 2, is mounted upon the usual brake lever arm 14, which pivots about supporting shaft 9, solidly attached to floorboard 1 by bracket 13. Brake lever arm 14 has a depressed shoulder 17 formed therein which receives a roller 18. When the parts are in the position shown in FIG. 1, the roller 18 is in the cut 17. Roller 18 is mounted on a laterally projecting end of a bent rod 19 which is slidably received within a tubular bracket 20. Tubular bracket 20 may be fixedly supported on the underside of floorboard 1. The rod 19 is connected to a flexible shaft 21 so that the shaft 21 moves as the rod 19 is moved due to the upward movement of the roller 18 as it moves out of the cut-away portion 17 in its movement from the position shown in FIG. 1 to that shown in FIG. 4. Roller 18, in cooperating with cut 17, also serves to support the weight of the braking foot when relaxed with the heel upon the floorboard, indicated by the dotted outlines shown in FIG. 4.

Crank arm 15 is firmly joined at one end to brake lever arm 14 at pivoting point 9, and is linkably joined at the other end with mechanical braking means generally indicated at 6, which connects with master brake cylinder 10 wherein piston 8 is reciprocably disposed. A plate 23, having teeth 24, formed along one edge thereof, is pivotally connected to crank arm 15 by means of a pivot pin 25. Springs 26 and 27, mounted upon rod 28, which is flexibly joined at its upper end to bracket 13, yieldably control rotational movement of plate 23 about pivot pin 25 by bearing upon extended arm 29 of plate 23. Master cylinder shaft 36 carries wedge-shaped head 22 for engagement with teeth 24 of plate 23, and also carries pivot-yoke 32 by which it is linkably joined to telescoped shaft 16. Shaft 16 carries cut-out portion 37 for positioning of telescoping shaft 7, integral with which is slidable assembly 34 embracing shaft 16. Assembly 34 has a chamber formed on one side thereof within which a ball 35 is mounted for reciprocation. Ball 35 is urged toward the cut 37 formed in the shaft 16 by means of a coil spring 38. The coil spring 38 is disposed within the plunger chamber and bears against the ball 35. The opposite end of the coil spring abuts against the plunger of an adjusting screw 39 which may be employed to adjust the tension on spring 38. Telescoping shaft 7 is joined at its lower end to crank arm 15 by means of pivot point 33.

In the operation of the device so far described, upon application of the brake by the operator, motion is transferred through brake lever arm 14 to crank arm 15. The roller 18 is then lifted from the cut 17 to the position shown in FIG. 4, and the plate 23, controlled by rod 28, is rotated about its pivot 25 in a counterclockwise direction as viewed in FIGS. 1, 2, and 4. Telescoping rod 7, through the sliding assembly 34, moves telescoped shaft 16 and the master cylinder piston 8 rearwardly until such a point where resistance of fluid within the master cylinder 10 indicates that the brake shoes have contacted and met with the initial resistance of the brake drums.

Since crank arm 15 has a motion multiplying effect at point 33 over the motion at point 25, it is clear that master cylinder piston 8 is moved from point 43 to approximately point 44 (FIG. 4) through a shorter movement of the brake pedal than with a conventionally attached brake pedal.

Inasmuch as the normal brake pedal movement to contact the brake shoes with the brake drums is approximately 1½ to 2 inches, it is evident that the brake pedal of this invention accomplishes the same motion with a fraction of such initiating movement.

In the rearward movement of shaft 36 cam-shaped plate 23, in rotating about pivotal point 25, maintains uniform clearance between wedge-shaped end 22 and teeth 24, each of which teeth has its base pointed directly toward pivotal point 25. Projecting wedge end 22 recedes toward the master cylinder along with shaft 36. Upon completion of the initial movement of master cylinder plunger 8 to contact the brake shoes with the brake drums resistance to pressure initiated by brake pedal 4 rapidly accumulates, tending to release the connection of sliding collar assembly 34 and shaft 16 through compression of spring 38 and consequent withdrawal of ball 35 from cut 37 (FIGS. 2 and 4). Shaft 36 then stops its rearward motion, and sliding collar assembly 34 continues its rearward motion. Meanwhile, due to the continued rearward movement of crank arm 15 along with telescoping shaft 7 and assembly 34, wedge end 22 engages the advancing cam-shaped plate 23 by seating in the most nearly adjacent tooth 24. Continued forward thrust of crank arm 15 is then imparted to shaft 36 directly and without multiplying ratio, so that actual setting of brake shoes against drums takes advantage of the full direct pressure of the foot as applied to the brake pedal 4. Since cam-shaped plate 23 has assumed a non-rotating position, spring 26 compresses, until such point that brakes are fully set.

Upon release of brake pedal 4, shaft 36 and crank arm 15, directly joined at wedge end 22 and pivoting point 25, are driven backwardly by fluid brake pressure against piston 8 until such point of lowering fluid pressure that brake shoes 40 are ready to withdraw from contact with drums 41, which is approximately the same point at which roller 35, drawn back with assembly 34 by shaft 7, is ready to re-engage with cut 37, a simultaneous condition which is further assured by the yielding of spring 27 on shaft 28. Relief of pressure on piston 8 and expanding pressure of spring 38 against ball 35 now at the edge of cut 37, re-establishes the multiplying leverage connection between telescoping shaft 7 and telescoped shaft 16, so that final return movement of brake pedal 4 completes the return motion of shaft 36 and piston 8 at a more rapid rate than when master cylinder shaft 36 and crank arm 15 are directly connected.

A carburetor assembly is generally indicated at 45 and such assembly is mounted within the engine compartment in the usual way. The assembly includes a carburetor housing 46 having a fuel passageway 47 therein. The usual butterfly throttle valve 48 is mounted within the passageway 47 on pivot points 49 and 50, which pass through pivot openings in the housing. The pivot pin 49 has a crank arm 51 fixed thereto, with the opposite end of the crank arm pivotally connected to the lower end of an accelerator shaft 52. The upper end of the accelerator shaft is pivotally connected by pivot 53 to the underside of the accelerator pedal.

Supplementary butterfly throttle valve 54 is pivotally mounted to the housing 46 within the passageway 47 by means of opposite pivot pins 55 and 56. The supplementary throttle valve 54 overrules the regular throttle valve 48, in a manner that will be more apparent from the following description.

A crank arm 57 has one end thereof fixed to the pivot 55 for rotation therewith and the opposite end is pivotally connected to the lower end of flexible shaft 21. Pivot shaft 56 is attached rigidly to the middle of arm 58 for rotational movement therewith. One extremity of arm 58 is flattened to form a flat contact 59. The other extremity forms a spring-attaching eye 153 through which spring 152 is flexibly joined to arm 58. A spring 60, which has one end connected to the arm 57 and the opposite end connected to the carburetor housing serves to normally hold the throttle valve 54 in its open position, as shown in FIG. 1.

The pivot 50, on throttle valve 48, has rigidly connected thereto one end of a rocker arm 61. The opposite end of the rocker arm 61 has an opening 62 therethrough which encircles an accelerator pump shaft 63, and a spring-attaching eye 151 whereby spring 152 is flexibly joined to rocker arm 61. A spring 64 also embraces the shaft 63 with the lower end thereof abutting against an annular stop 65, formed on the shaft 63, and with the upper end thereof bearing against the underside of rocker arm 61. Another annular stop or abutment 66 is formed on the shaft 63 above the rocker arm 61 and such rocker arm abuts thereagainst to raise the shaft 63. The lower end of shaft 63 is formed with a mushroom head 67 which overlies the flat end 59 of rocker arm 58.

Upon actuation of the brake pedal 4 and withdrawal of roller 18 from cut 17, the flexible shaft 21 moves up and rotates the crank arm 57 counterclockwise, viewing FIG. 1. Crank arm 57 turns the throttle valve 54 to its closed position bringing flat end 59 into contact with mushroom head 67 of the accelerator pump shaft 63, and expanding spring 152 providing expansion tension to counterbalance any movement of arm 61 to compress spring 64, so that the force required to open throttle 54 while shaft 63 is repressed remains substantially the same as when shaft 63 is not restrained by end 59, the resulting resistance to accelerator shaft 52 remaining substantially the same under both effective and ineffective throttle conditions. It should be pointed out that the diverting means for the accelerator pedal and the repression means for the accelerator pump perform similar functions, and that both types of supplementary spring control can be used at either of these throttle control points, both assisting in maintaining normal accelerator pedal resistance when the accelerator is rendered inoperative, returning the controlled shafting to its prepositioned location upon release of the overruling means. This prevents flow of extra accelerating fluid through the carburetor via port 68 of an accelerator pump 69. Rocker arm 61, attached to throttle valve 48, and held in a closed position by spring 64, follows the opening motion of throttle valve 48, when actuated through accelerator shaft 52 by the accelerator treadle 2; but, due to the blocking position of the end 59 on arm 58, the accelerating shaft 63 does not move and the accelerator pump 69 does not operate to deliver extra fluid so that only enough fluid flows through the carburetor to keep the engine running at idling speed. In FIG. 3, the end 59 is shown contacting the mushroom head 67, holding the accelerator pump closed. The arm 61 is shown in an ineffective actuated position compressing spring 64.

Referring to FIG. 2, a modified construction for controlling the flow of gas through the carburetor is illustrated. In certain types of carburetors the accelerator pump is vacuum actuated without outside means for control, and it is therefore difficult to restrict its action To accomplish this restriction to idling speed under braking conditions, the flexible shaft 21 is connected to supplementary throttle valve 54 in the same manner as in the embodiment above described. The same numerals are used to indicate similar parts in the present embodiment and it will be seen that the carburetor construction is substantially the same. Instead of employing the arm 58, as in the embodiment above described, the present embodiment employs an arm 75, one end of which is connected to the pivot shaft 56 for pivotal movement therewith. A vacuum valve shaft 76 is pivotally connected to the opposite end of the rocker arm 75 and the valve shaft 76 projects within the valve housing 77 with the valve integral with the opposite end thereof. The valve housing 77 opens to atmospheric pressure through vent 78, or to intake manifold vacuum line 79, depending on the location of arm 75, and communicates through an annular groove 80 in the valve to vacuum line 81, which connects to a vacuum cylinder 82. A piston 83 is disposed within the cylinder 82 and has a piston rod 84 which projects through an opening in one end thereof. A spring 85 is disposed within cylinder 82 and bears against the piston 83 to urge it toward its rod end.

Piston rod 84 is pivotally connected by means of a pivot 86 to the lower end of a slot and pivot arm 87. The arm 87 is pivotally mounted intermediate the ends thereof to a brace by means of a pivot shaft 88 which extends through an opening in the brace. The brace or bracket 90 is suitably secured to the floorboard 1.

The accelerator shaft 52 passes through an opening 97 in arm 87. The upper end of arm 87 is formed with a mallet head 98 which normally bears against a pivot arm 99, adjacent the upper end thereof. The upper end of arm 99 is formed with an opening 100 therethrough which embraces a rod 101 mounted to the underside of the floorboard 1. A spring 102 is mounted on the rod 101 having one end thereof fixed on the end of the rod and the opposite end thereof resiliently bearing against the upper end of arm 99. The spring 102 corresponds in tension to the carburetor spring 150. Engagement of the hammerhead 98 with the upper end of arm 99 creates a fulcrum for motion of the arm 99. The lower end of arm 99 is pivotally connected by means of a pivot 103 to the adjacent end of the accelerator shaft 52. The arm 99 is also pivotally connected intermediate the ends thereof by means of a pivot 104 to one end of an accelerator pedal rod 105. The opposite end of the rod 105 is pivotally connected to the underside of the accelerator pedal 2 by means of a pivot 106.

When the brake treadle 4 is actuated, the roller 18 is lifted from the cut 17 which, in turn, lifts the flexible shaft 21 and rotates valve 54, closing the throat of the carburetor. At the same time, rocker arm 75 is rotated to shift the vacuum valve from the position shown in FIG. 2 where it communicates vacuum line 81 with atmospheric pressure, to another position to communicate vacuum line 81 with intake manifold vacuum line 79. Since a maximum vacuum is at once made available in the manifold due to sudden closing of the carburetor throat, vacuum line 81 draws the piston 83 rearwardly in cylinder 82, collapsing spring 85, and pivoting the arm 87 in a clockwise direction, viewing FIG. 2. This action holds the lower end of the arm 99 and the accelerator shaft 52 at idling position, or returns it to this idling position due to engagement of the lower end of arm 99 with that part of arm 87 around opening 97. At the same time, the upper end of the arm 99 is freed from engagement with the hammerhead 98 so that the arm 99 is free to yield to any pressure from the rod 105 and acts against spring 102 which now offers the resistance to movement of the accelerator pedal which was formerly offered by spring 150.

When the brake treadle 4 is released and the flexible shaft 21 returns to its relaxed position, the throttle valve 54 opens, vacuum line 81 communicates with atmospheric pressure through the vacuum valve and vent 78. Spring 85 expands and thereby shifts the arm 87. The pivot point for arm 99 is again shifted to the upper end, re-establishing connection to the valve 48 to thereby control the carburetor for the accelerator pedal 2 from the spring 102 to spring 150.

What is claimed is:

1. In a control apparatus for an automobile or the like having a braking system, an accelerator, and an engine of the type that is energized by a fuel mixture of two ingredients, the combination of a first means for controlling the quantity of the fuel mixture admitted to the engine, a second means for controlling the quantity of the fuel mixture admitted to the engine, a third means for controlling the quantity of one of the fuel ingredients admitted to the engine, a fourth means for operating the first means and adapted to be connected to the braking system so that upon activation of the braking system it is actuated to operate the first means to reduce the quantity of the fuel mixture admitted to the engine, a fifth means for operating the second means and adapted to be connected to and actuated by the accelerator, a sixth means for operating the third means and adapted to be connected to and actuated by the accelerator, and a seventh means adapted to be connected to the braking system and to control the sixth means so that activation of the braking system renders the sixth means ineffective.

2. Control apparatus for an automobile or the like having an accelerator and a brake system comprising the combination of a fuel control unit including a pump for forcing fuel into the unit and first and second throttle valves arranged in series to regulate the flow of fluid out of the unit, first means for operating the first valve and adapted for connection to an accelerator whereby movement of the accelerator moves the first throttle valve, second means for operating the pump and adapted for connection to an accelerator whereby movement of the accelerator actuates the pump, third means for operating the second valve and adapted for connection to a brake system whereby actuation of the brake results in closing of the second throttle valve, and fourth means for controlling operation of the pump and adapted for connection to a brake system whereby actuation of the brake renders the pump ineffective.

3. The invention as claimed in claim 2 wherein the fourth means renders the second means inoperative to thereby make the pump ineffective during actuation of the brake.

4. Control apparatus for an automobile or the like having an accelerator and a brake system comprising the combination of a fuel control unit including first and second throttle valves arranged in series to regulate the flow of fluid out of the unit, first means for operating the first valve and adapted for connection to an accelerator whereby movement of the accelerator moves the first throttle valve, said first means including a vacuum operated disconnect device to render said first means inoperative, second means for operating the second valve and adapted for connection to a brake system whereby actuation of the brake system results in closing of the second throttle valve, and third means for admitting vacuum to the disconnect device and adapted for operation by the brake system, whereby acutation of the brake system operates the disconnect device to render the first means inoperative.

5. Control apparatus for an automobile or the like having an accelerator and a brake system comprising the combination of a fuel control unit including a throttle valve, first means for operating the unit and adapted for connection to an accelerator whereby movement of the accelerator actuates the unit, second means for controlling the operation of the throttle valve and adapted for connection to a brake system whereby actuation of the brake system results in closing of the throttle valve, third means for controlling operation of the first means and adapted for connection to the brake system and constructed whereby actuation of the brake system renders the first means ineffective and at least partially disconnects the accelerator from the unit, and means whereby the resistance to movement of the accelerator is substantially unchanged despite operation of the third means and disconnection of the accelerator from the unit, said last means including a substitute spring means for supplying resistance substantially equal to that removed upon operation of the third means.

6. In an automobile or the like having a brake system the combination of a fuel control unit including a pump element and first and second throttle elements, an accelerator, a brake member, a first operative connection between the accelerator and unit whereby the accelerator operates the first throttle element and the pump element, first means in said first connection providing yieldable resistance to movement of the accelerator in operating the element and pump elements, a second operative connection between the second throttle element and brake member whereby the brake member operates the second throttle element so that it closes when the brake system is actuated, a device in the first connection operated by the brake member for disconnecting the accelerator from at least one of the elements, and second means actuated upon operation of the device for providing supplemental yieldable resistance to movement of the accelerator so that despite disconnection of the accelerator from at least one of the elements the resistance to movement thereof remains substantially the same.

7. The invention as claimed in claim 1 wherein the fourth means includes resistance to activation of the braking system so that an operator of the automobile may ride the brake.

8. Control apparatus for an automobile or the like having an accelerator and a brake system with a brake member comprising the combination of a fuel control unit including throttle valve means and a pump, first means for controlling the throttle valve means and for connection to an accelerator whereby movement of the accelerator moves the throttle valve means, second means for controlling the pump connected to the first means and to the pump whereby the pump may be controlled by the accelerator, said second means including a disconnect device for rendering the second means inoperative, third means for controlling the throttle valve means and adapted for connection to a brake member whereby activation of the brake system closes the throttle valve means, and fourth means whereby activation of the brake system operates the disconnect device to render the pump ineffective.

9. In an automobile or the like having a carburetor including a throttle valve and an accelerator pump, an accelerator, a first operating connection between the accelerator and throttle valve, a second operating connection between the accelerator and pump, a disconnect device in said second connection for rendering it inoperative, a supplementary throttle control for said carburetor, a brake, and means operated upon actuation of the brake for operating said disconnect device and also said supplementary throttle control to throttle fluid flow through the carburetor.

10. In an automobile or the like having a carburetor including a throttle valve and an accelerator pump, the combination of an accelerator, an operating connection between the accelerator and carburetor, a disconnect device in said connection to render it inoperative, a supplementary throttle control for said carburetor, a brake, and means operated upon actuation of the brake for operating said disconnect device and also said supplementary throttle control to throttle fluid flow through the carburetor.

11. In an automobile or the like having an intake manifold with a carburetor connected thereto, the combination of an accelerator, an operating connection between the accelerator and carburetor, a vacuum operated disconnect in said connection to render it inoperative, a conduit receiving vacuum from said manifold and delivering it to said disconnect, a valve controlling fluid flow in said conduit, a brake, a throttle valve connected to the brake and operated upon actuation of the brake to control flow through the carburetor and thus vacuum in said manifold, and means for operating both the brake and said valve so that upon actuation of the brake the valve is moved to operate said disconnect.

12. In an automobile or the like having a carburetor including a throttle valve and a vacuum actuated accelerator pump, the combination of an accelerator, an operating connection between the accelerator and throttle valve, a disconnect device in said connection to render it inoperative, a supplementary throttle control for said carburetor, a brake, and means operated upon actuation of the brake for operating said disconnect device and also said supplementary throttle control to throttle fluid flow through the carburetor.

13. Control apparatus for an automobile or the like having a brake system and an accelerator having a fuel control unit including a pump for forcing fuel into the unit and throttle valve means for regulating the flow of fluid into the unit comprising the combination of first means for operating the valve means and adapted for connection to an accelerator whereby movement of the accelerator moves the throttle valve means, second means operating the pump and adapted for connection to an accelerator whereby movement of the accelerator actuates the pump, third means operating the valve means and adapted for connection to a brake system whereby actuation of the brake system results in closing of the throttle valve means, and fourth means adapted for connection to the brake system whereby actuation of the brake system renders the second means ineffective in actuating the pump, said fourth means re-establishing effectiveness of the second means upon deactuation of the brake system without resetting of the accelerator.

14. In a motor vehicle having a brake system and a fuel supply system, a brake pedal positioned for operation by one foot of a driver, an accelerator spaced from the brake pedal and positioned for operation by the other foot of a driver, first means operated by the brake pedal for actuating the brake system, second means operated by the accelerator for controlling the fuel supply system, said second means including disconnect means for rendering the second means inoperative and also including first resilient means resisting depression of the accelerator arranged so that operation of the disconnect means changes the resistances thereof, third means operated upon depression of the brake pedal for operating the disconnect, and including a substitute resilient means connected to the accelerator pedal and counteracting said change in resistance of the first resilient means so that resistance to depression of the accelerator remains substantially unchanged despite operation of the disconnect means.

15. The invention set forth in claim 14 wherein said disconnect device is of the type that reestablishes operativeness of the second means without resetting of the accelerator.

References Cited in the file of this patent

UNITED STATES PATENTS

| | | |
|---|---|---|
| 2,060,731 | Harroun | Nov. 10, 1936 |
| 2,203,777 | Detmers | June 11, 1940 |
| 2,230,335 | Smith | Feb. 4, 1941 |
| 2,244,116 | Polonec et al. | June 3, 1941 |
| 2,258,627 | Siesennap | Oct. 14, 1941 |
| 2,912,081 | Strauss | Nov. 10, 1959 |